(12) United States Patent
Kuth

(10) Patent No.: US 6,965,686 B2
(45) Date of Patent: Nov. 15, 2005

(54) DEVICE FOR FOUR-DIMENSIONAL REPRESENTATION OF A STRUCTURAL VARIATION, IN PARTICULAR OF THE COURSE OF A DISEASE

(75) Inventor: Rainer Kuth, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 601 days.

(21) Appl. No.: 09/954,164

(22) Filed: Sep. 18, 2001

(65) Prior Publication Data

US 2002/0034323 A1 Mar. 21, 2002

(30) Foreign Application Priority Data

Sep. 18, 2000 (DE) .................................. 100 46 111

(51) Int. Cl.⁷ ............................................. G06K 9/00
(52) U.S. Cl. ...................... 382/128; 382/154; 382/173; 600/516
(58) Field of Search ................................ 382/128–134, 382/164, 171, 173; 600/443, 516, 587, 337, 600/344, 138, 139, 159, 190, 197, 209, 372, 600/406, 435, 449, 459, 488, 517; 602/41, 602/58, 900; 128/201.28

(56) References Cited

U.S. PATENT DOCUMENTS

| 5,151,856 | A | * | 9/1992 | Halmann et al. ............ 600/508 |
| 5,564,412 | A | * | 10/1996 | Hennig ........................ 600/410 |
| 6,058,322 | A | * | 5/2000 | Nishikawa et al. ......... 600/408 |
| 6,083,162 | A | * | 7/2000 | Vining ........................ 600/407 |
| 6,346,124 | B1 | * | 2/2002 | Geiser et al. ............... 600/450 |
| 6,442,288 | B1 | * | 8/2002 | Haerer et al. ............... 382/128 |
| 6,697,660 | B1 | * | 2/2004 | Robinson .................... 600/409 |

FOREIGN PATENT DOCUMENTS

EP    0 952 546    10/1999

OTHER PUBLICATIONS

Ettinger et al., Automatic Registration for Multiple Sclerosis Change Detection, IEEE, 1994 pp. 297-306.
Haberäcker, Digitale Bildverarbeitung, *Carl Hanser Verlag*, 1985, pp. 196-205.

* cited by examiner

*Primary Examiner*—Kanjibhai Patel
*Assistant Examiner*—Abolfazi Tabatabai
(74) *Attorney, Agent, or Firm*—Young & Thompson

(57) ABSTRACT

Device for representing the time profile of a structural variation, in particular of the course of a disease with the aid of 2D or 3D data records, by a segmenting device in which time interval data records in the region of the structural variations are differently colored and subsequently matched with the aid of anatomical landmarks.

11 Claims, 1 Drawing Sheet

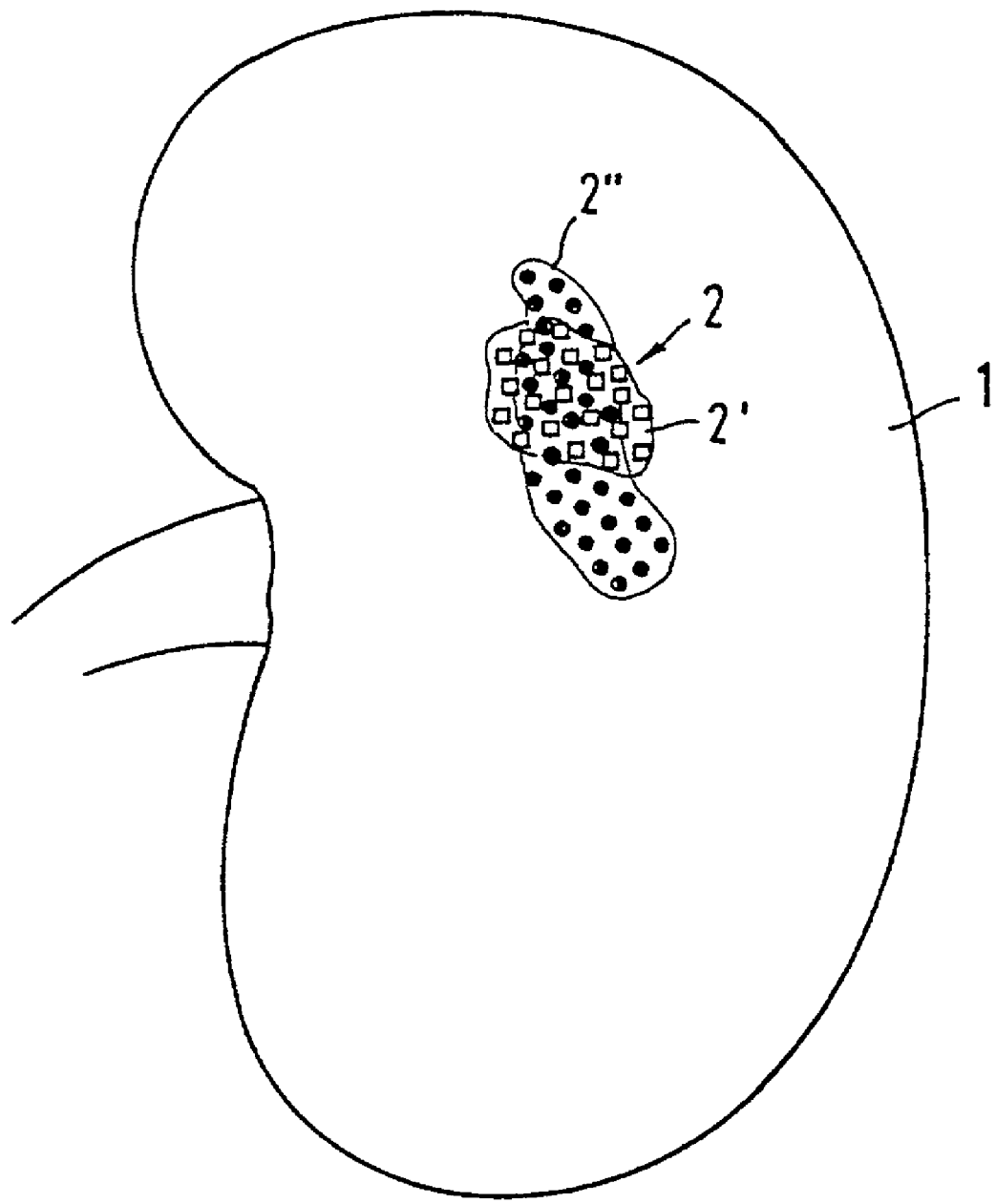

DEVICE FOR FOUR-DIMENSIONAL REPRESENTATION OF A STRUCTURAL VARIATION, IN PARTICULAR OF THE COURSE OF A DISEASE

BACKGROUND OF THE INVENTION

The invention relates to a device for representing the time profile of a structural variation, in particular of the course of a disease with the aid of 2D or 3D data records.

DESCRIPTION OF THE RELATED ART

At present, imaging diagnostic methods are being used ever more frequently to follow the course of a disease, and/or to monitor a therapy. For this purpose, the patient is repeatedly examined at certain time intervals. This produces a series of images which, independently of whether they are represented in 2D or 3D, can be viewed only next to one another or after one another, and so variations in the structure, that is to the say the course of a disease, in particular, can be followed only roughly and not very descriptively.

This failure of descriptiveness in the time variation, at any rate where the variations in tumor-type proliferations of tissue is concerned, also exists in the case of a device for representing the time profile of a structural variation such as has been described in Ettinger, G. J. et. al.: Automatic Registration for Multiple Sclerosis Change Detection: Proc. of the IEEE Workshop on Biomedical Image Analysis, 1994, pages 297–306. There, in conjunction with the segmentation of 2D or 3D data records, the distances of each transformed data point from the nearest reference surface point are determined in a complicated way and in repeated work steps, and ascertained as a Gaussian distribution over the squares of the minimum value. The result of this, however, is representations which are not suitable for detecting the time profile of a varying tumor.

The digital image processing described by P. Haberäcker in "Digitale Bildverarbeitung, Grundlagen und Anwendungen" ["Digital image processing, fundamentals and applications"], Hanser Verlag, 1985, pages 196–205, for pictorial representation of the time profile of the propagation of a contrast medium is also not suitable for the targeted production of the temporal growth of a tumor in the case of which a noncontinuous growth occurs, but regressions take place at one point and, in turn, proliferations are to be noted at another.

Finally, EP 0 952 546 A2 describes a processor for superimposing various images such that it is possible to detect one image through the other image. At best, this also can be implemented acceptably in the case of two images. For the time profile of a varying syndrome however, such sequential nesting cannot be used acceptably in the case of a multiplicity of pictures which are spaced apart.

SUMMARY OF THE INVENTION

It is therefore the object of the invention to create a device for representing the time profile of such structural variations with the aid of which it is possible to represent the variations within the image in a simpler, more descriptive and more precise way.

In order to achieve this object, a device of the type mentioned at the beginning is characterized according to the invention by a segmenting device by means of which the data records in the region of the structural variations are differently colored and subsequently matched with the aid of anatomical landmarks.

As an example, in the case of a pathological variation, such as a kidney tumor, not only is the variation imaged in various stages in a simple way next to one another by the device according to the invention, but the tumor is differently colored in the various stages and these images are matched such that it is possible to detect by color in one and the same image how the tumor is varying over time.

In this case, as regards the 2D representation, in particular, a pixel check controlled by a random number generator is carried out in term of pathological information, and on this basis coloring is then carried out if appropriate. This pixelwise checking, in which, of course, spacings always remain between the individual pixels, yields the advantage that the structural variation in each image data record is covered only point by point, and so space remains between these colored points for the differently colored points of the other image data records. In the event of complete coloration, there would then be no possibility of detecting variations in the image, for example shrinkage of the structural variation at one point.

In 3D, the appropriate transformation required for obtaining the 2D image per eye is carried out and, each pixel is colored, once again, using the algorithm discussed above.

BRIEF DESCRIPTION OF THE DRAWINGS

Further advantages, features and details of the invention emerge from the following description of an exemplary embodiment, as well as with the aid of the drawing, which shows a diagram of a kidney with a tumor, only two different pictures being reproduced in a matched representation, for the sake of clarity.

DESCRIPTION OF THE PREFERRED EMBODIMENTS

After some time, the tumor 2 present in the kidney 1 has changed from the initial configuration 2' marked by squares into the configuration 2" marked with circles. In the black and white image of the drawing, the squares and circles replace colored pixels, for example red, blue or green points.

In the case of the matched representation, a random number generator is started for each pixel in the 2D representation and initially checks the examinations for which pathological information was present in this pixel. This is followed by coloring with the color of the respective data record. The same is also performed with the other data records. Owing to the pixelwise scanning with only pointwise coloration of the disease structure found, space remains between the colored points for the differently colored points of the remaining data records, such that the course of the structural variation over time can actually be detected within a matched image. Owing to the fact that the pixel checking is controlled by the random number generator, it can be assumed that a pixel in one data record and a pixel in the other data record are detected exactly at the same point only relatively seldom, so that then the desired color information relating to the course naturally cannot be reproduced here.

The medical 3D image data record is a 3D matrix having in each case values of the signal intensity for each volumetric element. There are several options in this case for conditioning data in order to represent a profile:

1. The computer treats the 3D data record like a 2D data record, that that is to say a decision is taken for each individual volumetric element as to whether the latter is given a color and, if appropriate, which one. The 3D data record is then represented on the display screen in the usual way, thus, for example, as a section through the 3D data record or, for example, as a perspective illustration for both eyes separately. In this form, the "color" 3D data record could also be stored, archived or further processed as a "super document" instead of or in addition to the individual data records.

2. The user selects a slice or a perspective view, and the computer then generates the coloring.

Advantage: During viewing and analysis, the viewer can interactively vary parameters of the segmentation, for example.

What is claimed is:

1. A device for representing the time profile of a structural variation, in particular of the course of a disease with the aid of 2D or 3D data records, characterized by a segmenting device by means of which plural data sets are recorded over certain time intervals to create data records in the region of the structural variations that are differently colored and subsequently matched with the aid of anatomical landmarks.

2. The device as claimed in claim 1, characterized in that in the case of the 2D representation; pixel checking controlled by a random number generator in terms of pathological information is carried out, as is coloring, as appropriate.

3. The device as claimed in claim 1, characterized in that a transformation for obtaining a 2D image per eye is performed in a 3D data record, and subsequently algorithmically segmented and colored.

4. A device for representing the time profile of a structural variation, in the course of a disease, with the aid of 2D or 3D data records, comprising:

a segmenting device recording plural data sets, of a region of structural variations due to disease, the plural data sets being recorded over certain time intervals to form a single image from the plural data sets of the region of structural variations that are differently colored and subsequently matched with aid of anatomical landmarks to detect, by the different coloring shown in the single image, how the disease has varied over time.

5. The device as claimed in claim 4, wherein, in a 2D representation, pixel checking controlled by a random number generator in terms of pathological information is carried out and is reflected by the different coloring.

6. The device as claimed in claim 4, wherein, a transformation for obtaining a 2D image per eye is performed in a 3D data record and subsequently algorithmically segmented and colored.

7. A device for representing the time profile of a structural variation, in the course of a disease, with the aid of 2D or 3D data records, comprising:

a segmenting device recording plural data sets of a diseased region showing structural variations due to disease, the plural data sets being recorded over certain time intervals to form a single image from the plural data sets, each of the plural data sets indicating a time-specific structural condition of the diseased region in a color different from the other ones of the plural data sets, the plural data sets together forming a single time profile image of the diseased region in terms of differently colored structural variations matched with anatomical landmarks to detect, by the different coloring shown in the single image, how the disease has varied over time.

8. The device as claimed in claim 7, wherein, in a 2D representation, pixel checking controlled by a random number generator in terms of pathological information is carried out and is reflected by the different coloring.

9. The device as claimed in claim 7, wherein, a transformation for obtaining a 2D image per eye is performed in a 3D data record and subsequently algorithmically segmented and colored such that a separate transformation is carried out for each two eyes and a stereoscopic image is displayed.

10. The device as claimed in claim 7, wherein, the disease is a kidney tumor, and the single image shows the diseased region as a tumor that is differently colored for each of times of recording the plural data sets to represent by the different colors time-profile of the tumor over the times of recording.

11. The device as claimed in claim 7, wherein each of the plural data sets indicating the time-specific structural condition of the diseased region in the color different from the other ones of the plural data sets also indicates the time-specific structural condition of the diseased region by a symbol different from symbols of the other ones of the plural data sets.

* * * * *